US011787256B2

(12) United States Patent
Lancien et al.

(10) Patent No.: US 11,787,256 B2
(45) Date of Patent: Oct. 17, 2023

(54) STABILIZING BAR FOR A VEHICLE

(71) Applicant: SOGEFI SUSPENSIONS, Guyancourt (FR)

(72) Inventors: Jean-François Lancien, Raon l'Etape (FR); Abderrahman Ouakka, Douai (FR); Philippe Etienne Rouy, Chardogne (FR); Renaud Ridacker, St-Dizier (FR); Démis Coppin, Nancois sur Ornain (FR); Stephan Meyer, Douai (FR)

( * ) Notice: Subject to any disclaimer, the term of this patent is extended or adjusted under 35 U.S.C. 154(b) by 0 days.

(21) Appl. No.: 17/295,103

(22) PCT Filed: Nov. 20, 2019

(86) PCT No.: PCT/FR2019/052765
§ 371 (c)(1),
(2) Date: May 19, 2021

(87) PCT Pub. No.: WO2020/104755
PCT Pub. Date: May 28, 2020

(65) Prior Publication Data

US 2022/0016951 A1 Jan. 20, 2022

(30) Foreign Application Priority Data

Nov. 20, 2018 (FR) ...................................... 18 71631

(51) Int. Cl.
*B60G 21/055* (2006.01)
*F16F 1/14* (2006.01)

(52) U.S. Cl.
CPC .... *B60G 21/0551* (2013.01); *B60G 2202/135* (2013.01); *B60G 2204/1222* (2013.01);
(Continued)

(58) Field of Classification Search
CPC .............. B60G 21/055; B60G 21/0551; B60G 2202/135; B60G 2204/1222;
(Continued)

(56) References Cited

U.S. PATENT DOCUMENTS 4,138,141 A * 2/1979 Andersen .................. F16F 1/16 403/345
5,810,338 A * 9/1998 Koenig ..................... F16F 1/14 267/273

(Continued)

FOREIGN PATENT DOCUMENTS

CN 102149552 A * 8/2011 ........... B60G 21/055
DE 102013103461 A1 10/2014

(Continued)

OTHER PUBLICATIONS

English machine translation of DE 102013103461.
English language abstract of WO 2019/097198.

*Primary Examiner* — Jason D Shanske
*Assistant Examiner* — Daniel M. Keck
(74) *Attorney, Agent, or Firm* — Brian Gordaychik

(57) ABSTRACT

A stabilizing bar for a vehicle, comprising: a central portion, which is elongate; a first attachment portion configured to be attached to a first part of the vehicle secured to a first wheel of the vehicle; and a first bearing configured to be attached to the chassis of the vehicle, the stabilizing bar comprising, between the central portion and the first attachment portion, a first curved portion, the first curved portion being curved along a curve having a radius of curvature which is strictly increasing with increasing distance from the first bearing.

22 Claims, 3 Drawing Sheets

52
s=smax
Rmax=f(s=smax)
R=f(s)
10
Rmin=f(s=0)
20
51
11
s
s=0
DO
41
P

(52) U.S. Cl.
CPC ................ *B60G 2204/1224* (2013.01); *B60G 2204/418* (2013.01); *B60G 2206/012* (2013.01); *B60G 2206/427* (2013.01)

(58) Field of Classification Search
CPC ...... B60G 2204/1224; B60G 2204/418; B60G 2206/012; B60G 2206/427; B60G 2206/8103; F16F 1/14
See application file for complete search history.

(56) References Cited

U.S. PATENT DOCUMENTS

| | | | | |
|---|---|---|---|---|
| 6,206,392 | B1 * | 3/2001 | Siecinski ............. | B21D 17/025 280/124.13 |
| 2011/0101630 | A1 | 5/2011 | Sakai | |

FOREIGN PATENT DOCUMENTS

| | | | |
|---|---|---|---|
| EP | 1304242 | A2 | 4/2003 |
| FR | 2531014 | A2 * | 2/1984 |
| WO | 2019/097198 | A1 | 5/2019 |

* cited by examiner

12

41
52
10
P
R=f(s)
51
20
11

52 s=smax
Rmax=f(s=smax)
10
R=f(s)
Rmin=f(s=0)
20
51
11
s
s=0
DO
41
P

STABILIZING BAR FOR A VEHICLE

TECHNICAL FIELD

The present disclosure relates to a stabilizing bar for a vehicle and a method of manufacture of a stabilizing bar of this type.

BACKGROUND

Most vehicles with axles are provided with stabilizing assemblies which are such that the two wheels of the same axle are generally connected by a stabilizing bar, also called an anti-sway bar or anti-roll bar.

A known stabilizing assembly for a vehicle comprising a stabilizing bar of this type is shown in FIG. 1.

The stabilizing assembly 101 for a vehicle comprises a stabilizing bar 110. The stabilizing bar 110 is installed between two wheels 400, 400' of the same axle. To this end, the stabilizing bar 110 is equipped at its end with two attachment portions 112, 112'. The attachment portion 112 is designed to be attached to a part of the vehicle secured to the wheel 400, in the present case to a control arm 410 of the wheel 400 via links (not shown). Likewise, the attachment portion 112' is designed to be attached to a part of the vehicle secured to the wheel 400', in the present case a control arm 410' of the wheel 400' via links (not shown).

The stabilizing bar 110 is therefore a suspension element of the vehicle which forms a spring tending to secure the two wheels 400, 400' together, and which thus allows limiting roll during turns and reducing the deformations undergone by the suspension so as to hold the tires flat as much as possible on the ground and therefore to retain maximum adhesion. The stabilizing bar 110 can thus be loaded both in torsion and in bending.

The stabilizing bar 110 also comprises a central portion 111, which is elongate. Two bearings 120 intended to be attached to the chassis of the vehicle are mounted on the stabilizing bar 110.

The stabilizing bar 110 is metallic, and typically made of steel.

Generally, the stabilizing bar 110 is one of the parts of the vehicle the shape of which is defined last, depending on the space which is not already occupied by other elements of the vehicle, such as structural elements for example or suspension elements. The shape of the stabilizing bar 110 can thus be relatively complex. In practice, this shape is obtained by bending an elongate and rectilinear metallic product, typically of steel, also called a billet.

FIG. 2 shows in more detail a typical shape of the stabilizing bar 110 obtained by bending of this type. During this type of bending, the billet is locally deformed by elastoplastic bending, under cold or hot conditions. This elastoplastic bending results locally in a flat arc. Thus it can be seen in FIG. 2 that, between the central portion 111 and the attachment portion 112, the stabilizing bar 110 obtained has a flat arc (also called an elbow 141) included in a plane P1, where the metallic billet has been locally deformed, and straight portion 151, 152 where the metallic billet has not been locally deformed. The elbow 141 has a constant radius of curvature R.

When the stabilizing bar 110 must adopt a more complex shape due to the bulk of the vehicle, it can also have several elbows separated by straight portions, the elbows being included in planes different from one another so as to obtain a stabilizing bar 110 with a three-dimensional shape.

However, the elbows are particularly critical regions from the standpoint of mechanical strength, and in particular the elbow 141, on the one hand due to its position (closest to the bearing 120) within the stabilizing bar 110, which position leads to a maximum load both in torsion and in bending, and on the other hand due to the shape of the elbow itself, which leads to a stress concentration, most particularly in the inner region 141C of the elbow 141. It is therefore absolutely imperative to dimension the stabilizing bar 110, and therefore the metallic billet, in such a manner that the elbow 141 has the necessary mechanical strength.

Yet in practice, the metallic billet (and therefore also the stabilizing bar 110) very frequently has a constant cross section and diameter along its entire length. The result is that the dimensioning of the stabilizing bar 110 at the elbow 141 determines the dimensioning of the entire stabilizing bar 110. The stabilizing bar 110 is therefore dimensioned adequately at the elbow 141, but overdimensioned elsewhere, this most particularly if the stabilizing bar 110 is designed to resist very high forces. This overdimensioning leads to excess mass of the stabilizing bar, and therefore of the vehicle.

There exists therefore a real need for a stabilizing bar for a vehicle as well as a method of manufacture of such a stabilizing bar which are free, at least in part, of the disadvantages inherent in the aforementioned known configurations.

SUMMARY

The present disclosure relates to a stabilizing bar for a vehicle, comprising:

a central portion, which is elongate;

a first attachment portion configured to be attached to a first part of the vehicle secured to a first wheel of the vehicle; and a first bearing configured to be attached to the chassis of the vehicle, the stabilizing bar comprising, between the central portion and the first attachment portion, at least one first curved portion, the first curved portion being curved along a first curve having a radius of curvature which is strictly increasing with increasing distance from the first bearing.

Due to the fact that the radius of curvature is strictly increasing with increasing distance from the first bearing, the stresses are more uniformly distributed within the first curved portion than with a constant radius of curvature.

In certain embodiments, the first curve has a radius of curvature which is a polynomial function of the curvilinear abscissa of said curve.

In certain embodiments, the first curve has a radius of curvature which is an affine function of the curvilinear abscissa of said curve.

In certain embodiments, the stabilizing bar comprises a plurality of first curved portions between the central portion and the first attachment portion, and at least the first curved portion closest to the first bearing is curved along a first curve having a radius of curvature which is strictly increasing with increasing distance from the first bearing.

In this manner, the stresses are more uniformly distributed as mentioned above, within the first curved portion which is closest to the first bearing. In other words, the first curved portion, and in particular its inner region, has a lower stress concentration that in an elbow with a constant radius of curvature. Yet as mentioned above, it is the curved portion closest to the bearing which determines the dimensioning of the entire stabilizing bar. It is therefore possible to obtain either a stabilizing bar with better mechanical properties starting with an identical billet, or a lighter stabilizing bar with identical mechanical properties. It is thus possible to obtain an improvement in mass of approximately 4% relative to a stabilizing bar made of the same steel.

In certain embodiments, said first curved portion closest to the first bearing is located between the first bearing and the first attachment portion.

In certain embodiments, the stabilizing bar also comprises:

a second attachment portion configured to be attached to a second part of the vehicle secured to a second wheel of the vehicle; and a second bearing configured to be attached to the chassis of the vehicle, the stabilizing bar comprising, between the central portion and the second attachment portion, a second curved portion, the second curved portion being curved along a second curve having a radius of curvature which is strictly increasing with increasing distance from the second bearing.

Due to the fact that the radius of curvature is increasing with increasing distance from the second bearing, the stresses are more uniformly distributed within the second curved portion than with a constant radius of curvature, which procures the same advantages as for the first curved portion.

In certain embodiments, the stabilizing bar comprises a plurality of second curved portions between the second bearing and the second attachment portion, and at least the second curved portion closest to the second bearing is curved along a second curve having a radius of curvature which is strictly increasing with increasing distance from the second bearing.

In this manner, the stresses are more uniformly distributed, as mentioned above, within the second curved portion which is closest to the second bearing, which procures the same advantages as for the first curved portion.

In certain embodiments, said second curved portion closest to the second bearing is located between the second bearing and the second attachment portion.

In certain embodiments, the first curve and the second curve are symmetrical.

The manufacture of the stabilizing bar is therefore simplified. In particular, when the stabilizing bar is manufactured by bending of a metallic billet, it is sufficient to carry out symmetrical operations on the two ends of the metallic billet.

The present disclosure also relates to a stabilizing bar for a vehicle, comprising:

a central portion, which is elongate;

a first attachment portion configured to be attached to a first part of the vehicle secured to a first wheel of the vehicle; and a first bearing configured to be attached to the chassis of the vehicle, the stabilizing bar comprising, between the central portion and the attachment portion, at least one first curved portion, the first curved portion being curve along a first curve having a radius of curvature which is strictly decreasing with increasing distance from the first bearing.

Due to the fact that the radius of curvature is strictly decreasing with increasing distance from the first bearing, the stresses are more uniformly distributed within the first curved portion that with a constant radius of curvature. Thus it is possible to obtain an improvement in mass relative to a stabilizing bar made of the same steel.

In certain embodiments, the first curve has a radius of curvature which is a polynomial function of the curvilinear abscissa of said curve.

In certain embodiments, the first curve has a radius of curvature which is an affine function of the curvilinear abscissa of said curve.

In certain embodiments, the stabilizing bar comprises a plural of first curve portions between the central portion and the first attachment portion, and at least one first curved portion closest to the first bearing is curved along a first curve having a radius of curvature which is strictly decreasing with increasing distance from the first bearing.

In certain embodiments, said first curved portion closest to the first bearing is located between the first bearing and the first attachment portion.

In certain embodiments, the stabilizing bar also comprises:

a second attachment portion configured to be attached to a second part of the vehicle secured to a second wheel of the vehicle;

and a second bearing configured to be attached to the chassis of the vehicle, the stabilizing bar comprising, between the central portion and the second attachment portion, a second curved portion, the second curved portion being curved along a second curve having a radius of curvature which is strictly decreasing with increasing distance from the second bearing.

Due to the fact that the radius of curvature is decreasing with increasing distance from the second bearing, the stresses are more uniformly distributed within the second curved portion that with a constant radius of curvature, which procures the same advantages as for the first curved portion.

In certain embodiments, the stabilizing bar comprises a plurality of second curved portions between the second bearing and the second attachment portion, and at least the second curved portion closest to the second bearing is curved along a second curve having a radius of curvature which is strictly decreasing with increasing distance from the second bearing.

In this manner, the stresses are more uniformly distributed, as mentioned above, within the second curved portion which is closest to the second bearing, which procures the same advantages and for the first curved portion.

In certain embodiments, said second portion closest to the second bearing is located between the second bearing and the second attachment portion.

In certain embodiments, the first curve and the second curve are symmetrical.

In certain embodiments, the stabilizing bar has a hollow cross section.

The stabilizing bar is then lighter than if it had a solid cross section, which is advantageous in terms of the total mass of the stabilizing assembly and therefore of the vehicle. In addition, the fact that the first curved portion (and possibly the second curved portion) has a strictly increasing or strictly decreasing radius of curvature, as discussed above, is most particularly advantageous when the stabilizing bar has a hollow cross section. In fact, in this case, the fact that the stresses are more uniformly distributed in the curved portion allows increasing the fatigue resistance of the walls of the curved portion, most particularly its inner wall, this inner wall being only rarely shot-blasted. In addition, the fact of adopting a strictly increasing or strictly decreasing radius of curvature, as discussed above, allows reducing the ovalization of the hollow section of the bar, which further increases the fatigue resistance of the curved portion.

In certain embodiments, the stabilizing bar is manufactured by bending of a metallic billet.

In certain embodiments, the metallic billet has a circular, elliptical, oval or ovoid cross section. This cross section can be solid or even hollow.

Thus the stabilizing bar can be manufactured from the same type of starting product as the known stabilizing bars described above.

In certain embodiments, the metallic billet has a variable cross section long its length.

It is thus possible to maximally optimize the dimensioning of the metallic billet, and thereby to accomplish an improvement in the mass of the vehicle.

The present disclosure also relates to a stabilizing assembly for a vehicle comprising a stabilizing bar according to any one of the aforementioned possibilities.

The aforementioned features and advantages, as well as others, will appear upon reading the detailed description that follows, of exemplary embodiments of the proposed stabilizing bar and manufacturing method. This detailed description makes reference to the appended drawings.

The appended drawings are schematic and are intended first of all to illustrate the principles of the disclosure.

In these drawings, from one (FIG.) to another, identical elements (or parts of elements) are labeled with the same reference symbols.

DESCRIPTION OF THE EMBODIMENTS

In order to make the disclosure more concrete, examples of stabilizing assemblies and of manufacturing methods are described hereafter in detail, with reference to the appended drawings. It is recalled that the disclosure is not limited to these examples.

Figure 1:
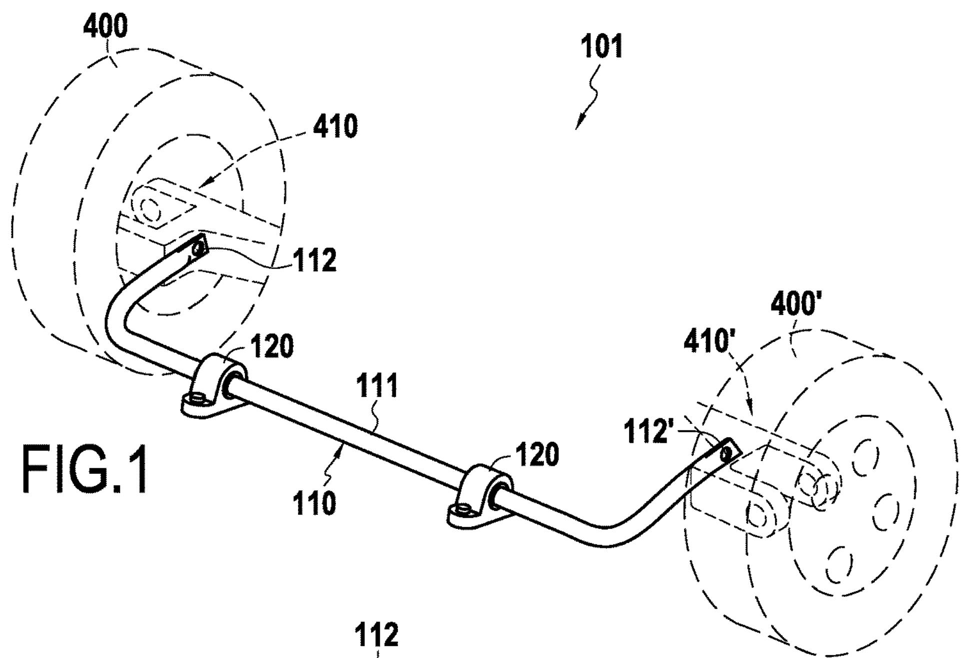
FIG. 1 is a perspective view of a known stabilizing assembly for a vehicle.
Figure 2:
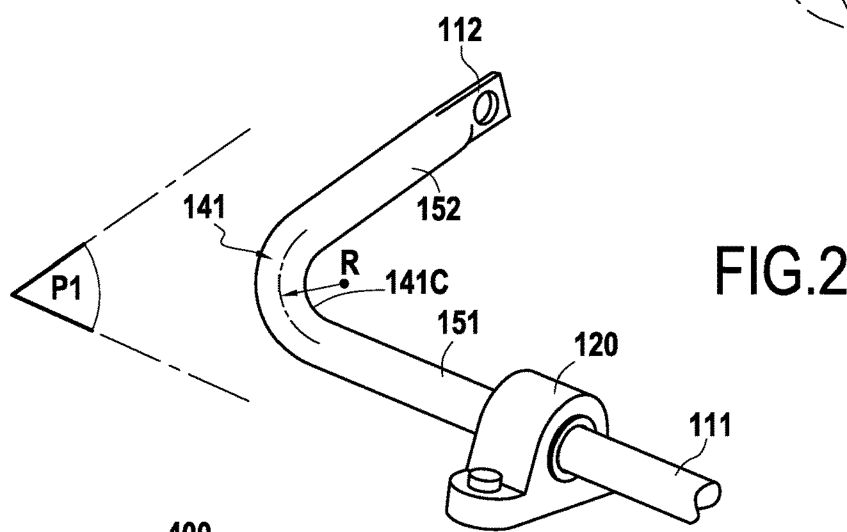
FIG. 2 is a perspective view of the stabilizing bar of the stabilizing assembly for a vehicle of FIG. 1.
Figure 3:
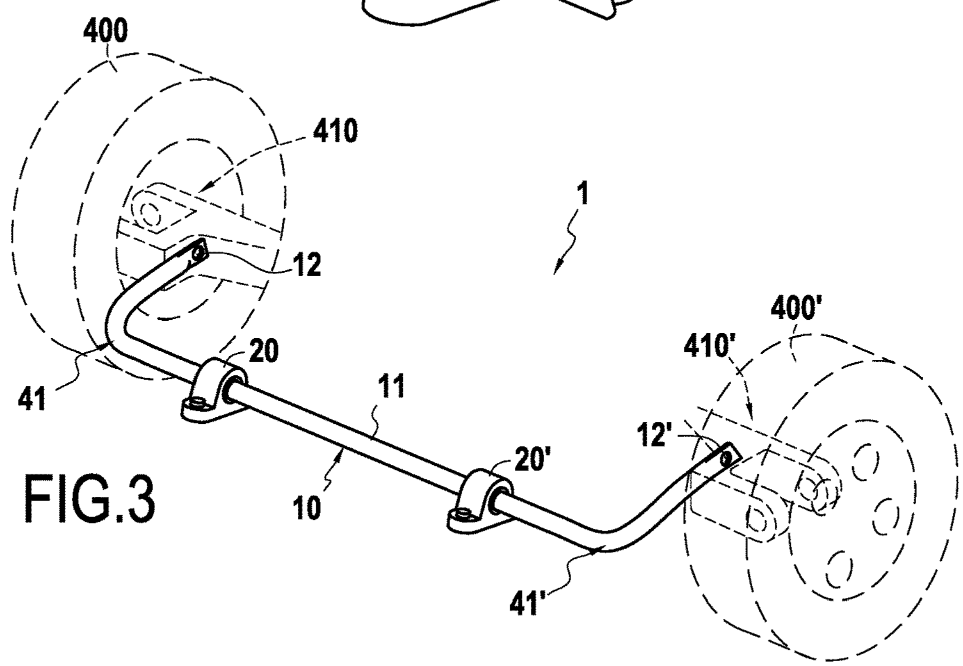
FIG. 3 is a perspective view of an example of a stabilizing assembly for a vehicle according to the disclosure.

An example of a stabilizing assembly 1 is shown in FIG. 3.

The stabilizing assembly 1 for a vehicle comprises a stabilizing bar 10. The stabilizing bar 10 is installed between two wheels 400, 400' of the same axle. To this end, the stabilizing bar 10 is equipped at its ends with two attachment portions 12, 12'. The attachment portion 12 is designed to be attached to a part of the vehicle secured to the wheel 400, in the present case to a control arm 410 of the wheel 400, via links (not shown). Likewise, the attachment portion 12' is designed to be attached to a part of the vehicle secured to the wheel 400', in the present case a control arm 410' of the wheel 400', via links (not shown).

The stabilizing bar 10 is therefore a suspension element of the vehicle which forms a spring tending to secure the two wheels 400, 400'. The stabilizing bar 10 can therefore be loaded both in torsion and in bending.

The stabilizing bar 10 also comprises a central portion 11, which is elongate. Two bearings, 20, 20' intended to be attached to the chassis of the vehicle are mounted on the stabilizing bar 10. The bearing 20 is mounted between the central portion 11 and the attachment portion 12. The bearing 20' is mounted between the central portion 11 and the attachment portion 12'.

The stabilizing bar 10 is metallic, and typically manufactured from steel.

Figure 4:
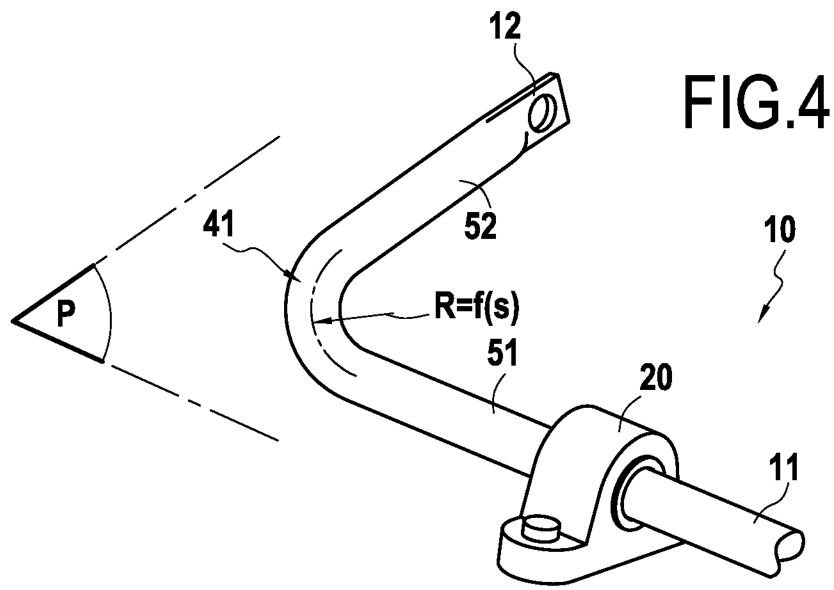
FIG. 4 is a perspective view of the stabilizing bar of the stabilizing assembly for a vehicle of FIG. 3.
Figure 5:
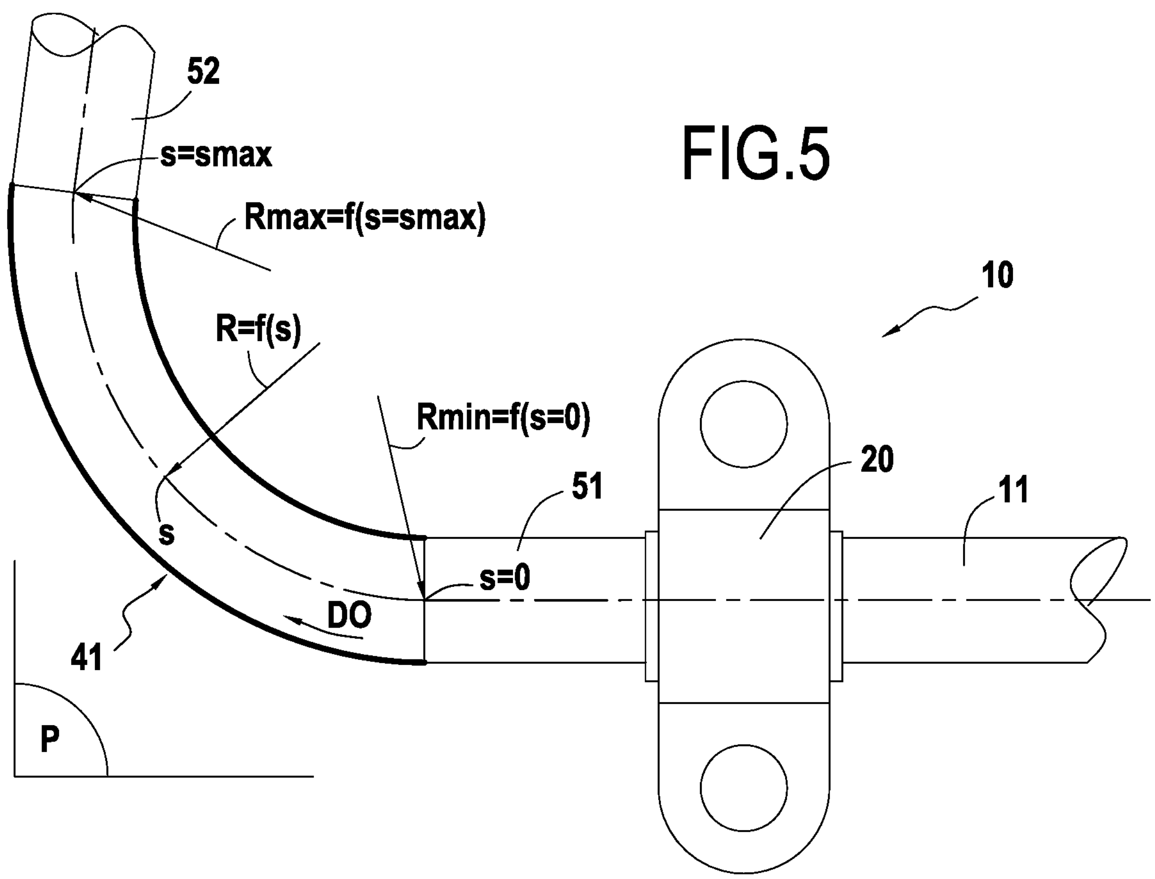
FIG. 5 is a view of the stabilizing bar of FIG. 4, from above and perpendicular to the plane P of FIG. 4.

The stabilizing bar 10 comprises, between the central portion 11 and the attachment portion 12, at least one curved portion. In FIGS. 3 to 5, only the curved portion 41 which is closest to the bearing 20 is shown, it being understood that the stabilizing bar 10 can or cannot comprise other curved portions between this curved portion 41 and the attachment portion 12, and/or other curved portions between the bearing 20 and the attachment portion 12. In addition, in FIGS. 3 to 5, the curved portion 41 is located between the bearing 20 and the attachment portion 12, but it is specified that the curved portion 41 can also be located between the bearing 20 and the central portion 11.

The stabilizing bar 10 can comprise a rectilinear portion 51 between the bearing 20 and the curved portion 41. This rectilinear portion 51 facilitates the operation of installing the bearing 20 on the stabilizing bar 10, which installation operation is carried out after the creation of the curved portion 41 by bending. In addition, the stabilizing bar 10 typically comprises a rectilinear portion 52 between the curved portion 41 and the attachment portion 12.

The curved portion 41 is curved along a curve which has a radius of curvature which is strictly increasing with increasing distance from the bearing 20, as shown schematically in FIGS. 4 and 5.

What is meant by "has a radius of curvature which is strictly increasing with increasing distance from the bearing 20" is to designate not only the fact that the curve is such that its radius of curvature does not decrease between its initial point closest to the bearing 20 and its final point farthest away from the bearing 20, so that in particular its radius of curvature at its initial point is strictly smaller than its radius of curvature at its final point, but also the fact that the curve does not have any region of constant or decreasing radius of curvature. Thus, from the rectilinear portion 51 until the rectilinear portion 52, the curved portion 41 has no region with a constant or decreasing radius of curvature. In addition, the curve is typically such that its radius of curvature varies continuously between its initial point closest to the bearing 20 and its final point farthest from the bearing 20.

Due to the fact that the radius of curvature is strictly increasing with increasing distance from the bearing 20, the stresses are distributed more uniformly within the curved portion 41 that with a constant radius of curvature.

This is particularly beneficial when the curved portion closest to the bearing 20—in this case, the curved portion 41—is curved along a curve which has a radius of curvature which is strictly increasing with increasing distance from the bearing 20.

In fact, the stresses are distributed more uniformly, as mentioned above, within the curved portion 41 which is closest to the bearing 20. In other words, the curved portion 41, and in particular its inner region, has a smaller stress concentration than in an elbow with a constant radius of curvature. Yet as mentioned above, it is the curved portion that is closest to the bearing which determines the dimensioning of the entire stabilizing bar. It is therefore possible to obtain either a stabilizing bar with better mechanical properties starting with an identical billet, or a lighter stabilizing bar with identical mechanical properties. It is thus possible to obtain an improvement in mass of approximately 4% relative to a stabilizing bar made of the same steel.

In certain variants, the curve has a radius of curvature which is a polynomial function f of the curvilinear abscissa s of said curve. In other words, the radius of curvature R of the curve is such that R=f(s), where f is a polynomial function and s is the curvilinear abscissa of said curve. A polynomial function f of this type is naturally continuous, so that the radius of curvature R varies continuously as discussed above.

Within the meaning of the present disclosure, what is meant by a "polynomial function" is any function of the variable s of the type $a_n s^n + a_{n-1} s^{n-1} + \ldots + a_1 s + a_0$, where n is a positive integer (also called the degree of the polynomial) and $a_n, a_{n-1}, \ldots, a_1, a_0$ are real constants with $a_n \neq 0$.

Naturally, the polynomial function f has a degree at least equal to 1, so that the radius of curvature R is actually strictly increasing between Rmin=f(s=0) and Rmax=f (s=smax) over the interval [0; smax] with a curvilinear s to be considered for the curve. In addition, the polynomial function f is naturally strictly positive, taking into account the fact that a radius of curvature is by definition strictly positive.

In addition, the curvilinear abscissa s of the curve is defined so that its zero is at the point of the curve which is closest to the bearing 20, i.e. in the example of FIG. 5, at the point of the curve which is in contact with the rectilinear portion 51. In addition, the curve is oriented in such a manner that its curvilinear abscissa s increases when the curve is followed while moving away from the bearing 20. The direction of orientation DO of the curvilinear abscissa is shown in FIG. 5.

In certain particular variants, the curve has a radius of curvature which is an affine function of the curvilinear abscissa of said curve.

By "affine function" is meant a polynomial function of degree 1, i.e. a function of the variable s of the $a_1 s + a_0$ type, where $a_1$, $a_0$ are real constants. The affine function is naturally strictly positive over the interval [0; smax] of the curvilinear abscissa s to be considered for the curve, taking into account the fact that a radius of curvature is by definition strictly positive.

In certain embodiments, the stabilizing bar 10 comprises, between the central portion 11 and the attachment portion 12', at least one second curved portion. In FIGS. 3 to 5, only the second curved portion 41' which is closest to the bearing 20' is shown, it being understood that the stabilizing bar 10 can or cannot comprise other curved portions between this second curved portion 41' and the attachment portion 12', and/or other curved portions between the bearing 20' and the attachment portion 12'. In addition, in FIGS. 3 to 5, the curved portion 41' is located between the bearing 20' and the attachment portion 12', but it is specified that the curved portion 41' can also be located between the bearing 20' and the central portion 11'.

The stabilizing bar 10 can comprise a rectilinear portion (not labeled) between the bearing 20' and the curved portion 41'. This rectilinear portion facilitates the operation of installing the bearing 20' on the stabilizing bar 10, which installation operation is carried out after the creation of the curved portion 41' by bending.

Like the curved portion 41, the second curved portion 41' is curved along a second curve which has a radius of curvature which is strictly increasing with increasing distance from the bearing 20', with the same advantages as for the curved portion 41.

In addition, like the curve of the curved portion 41, the second curve may have a radius of curvature which is a polynomial. The second curve may have a radius of curvature which is an affine function of the curvilinear abscissa of said second curve, with the same advantages as for the curved portion 41.

In certain embodiments, the curve of the curved portion 41 and the second curve of the second curved portion 41' are symmetrical. More particularly, in certain embodiment, the stabilizing bar 10 can have planar symmetry relative to a plane passing through the center of the central portion 11. This simplifies the manufacture of the stabilizing bar 10 by bending, because it is then sufficient to carry out symmetrical operation on the two ends of the metallic billet.

It is specified here that the curve of the curved portion 41 and the second curve of the second curved portion 41' are planar, i.e. entirely included in a single plane, in this case the plane P shown in FIGS. 4 and 5.

The stabilizing bar 10 is generally metallic. What is meant by "metallic" is that the stabilizing bar 10 is made of a metallic element or of a metallic alloy. In certain embodiments, the stabilizing bar may be made of steel. The stabilizing bar may be made of a steel suitable for undergoing quenching and tempering heat treatments.

The stabilizing bar 10 can have a circular, elliptical, oval or ovoid cross section. In the present disclosure, "oval" designates a shape comprising two mutually symmetrical circular arcs of which the respective ends are linked by two mutually parallel straight lines, and which therefore have two axes of symmetry. In addition, the stabilizing bar 10 can have a solid cross section or a hollow cross section. In certain embodiments, the stabilizing bar 10 has a variable cross section along its length.

The stabilizing bar 10 can have undergone heat treatments, for example quenching and tempering, intended to increase its mechanical strength and its durability. The outer surface of the stabilizing bar 10 can have been painted and/or have undergone various surface treatment, such as anti-corrosion and/or anti-gravel strike treatments, etc., intended to increase the mechanical strength and the durability of the stabilizing bar 10.

The stabilizing bar 10 can be manufactured by bending of a metallic billet.

What is meant by a "metallic billet" is an elongate and rectilinear metallic product. What is meant by "metallic" is that the billet is made of a metallic element or of a metallic alloy. In certain embodiments, the metallic billet may be of steel. The metallic billet may be of a steel suitable for undergoing quenching and tempering heat treatments.

The metallic billet can have a circular, elliptical, oval or ovoid cross section, which can be solid or hollow, corresponding the desired cross section of the stabilizing bar 10 to be manufactured. In certain embodiments, the metallic billet has a variable cross section along its length.

Figure 7:
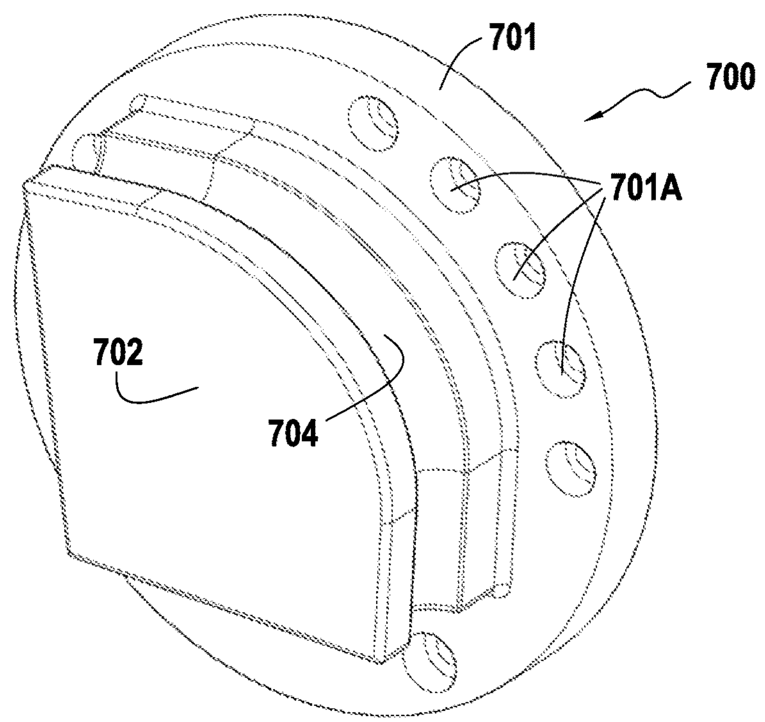
FIG. 7 is a perspective view showing a forming tool allowing creating the stabilizing bars of FIGS. 4 to 6 by bending of a metallic billet.

More particularly, the stabilizing bar 10 can be manufactured by bending by winding the metallic billet around a shaping tool. FIG. 7 shows in perspective a shaping tool 700 suitable for this bending by winding around a shaping tool.

As shown in FIG. 7, the shaping tool comprises an attachment part 701 and a forming part 702. The attachment part 701 is able to allow the attachment of the shaping tool 700 to a frame, for example by means of nuts received in through holes 701A. The shaping part 702 protrudes relative to the attachment part 701 and has a groove 704, the shape of which corresponds to the shape of the curved portion 41, 41' to be created. The curved portion 41, 41' is created by holding a part of the metallic billet in place against one end of the groove 704, and by applying to the metallic billet a force bringing the outer wall of the billet against the walls of the groove 704. The tooling suitable for doing this is well known per se and is therefore not described in more detail here.

Figure 6:
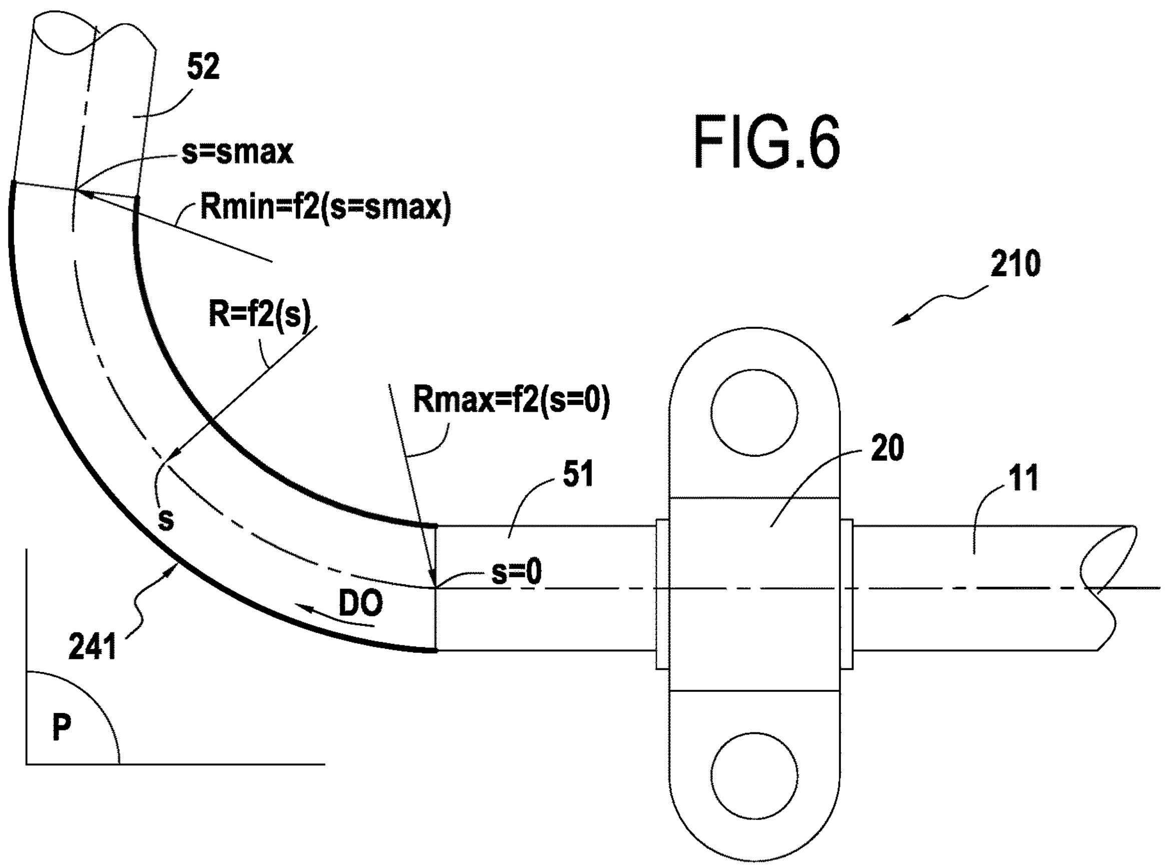
FIG. 6 is a view similar to FIG. 5, showing another stabilizing bar which can be installed in the stabilizing assembly for a vehicle of FIG. 3.

FIG. 6 shows a stabilizing bar 210 according to one variant embodiment. In FIG. 6, elements identical to those of FIGS. 3 to 5 bear the same reference symbols and are not described in detail again.

The stabilizing bar 210 comprises, between the central portion 11 and the attachment portion 12, at least one curved portion 241. In FIG. 6, only the curved portion 241 which is closest to the bearing 20 is shown, it being understood that the stabilizing bar 10 can or cannot comprise other curved portion between this curved portion 241 and the attachment portion 12, and/or other curved portions between the bearing 20 and the attachment portion 12. In addition, in FIG. 6, the curve portion 241 is located between the bearing 20 and the attachment portion 12, but it is specified that the curved portion 241 can also be located between the bearing 20 and the central portion 11.

The curved portion 241 is similar to the curved portion 41, the only exception being that the curved portion 241 is curved along a curve which has a radius of curvature which is strictly decreasing with increasing distance from the bearing 20, as shown schematically in FIG. 6.

What is meant by "has a radius of curvature which is strictly decreasing with increasing distance from the bearing 20" designates not only the fact that the curve is such that its radius of curvature does not increase between its initial point closest to the bearing 20 and its final point farthest away from the bearing 20, so that in particular, its radius of curvature at its initial point is strictly greater than its radius of curvature at its final point, but also the fact that the curve does not have any region with a constant or increasing radius of curvature. Thus, from the rectilinear portion 51 until the rectilinear portion 52, the curved portion 241 has no region with a constant or increasing radius of curvature. In addition, the curve is typically such that its radius of curvature varies continuously between its initial point closest to the bearing 20 and its final point farthest from the bearing 20.

Due to the fact that the radius of curvature is strictly decreasing with increasing distance from the bearing 20, the stresses are more uniformly distributed within the curved portion 241 that with a constant radius of curvature.

This is particularly beneficial when the curved portion closest to the bearing 20—in this case, the curved portion 241—is curved along a curve which has a radius of curvature which is strictly decreasing with increasing distance from the bearing 20.

In fact, the stresses are more uniformly distributed, as mentioned above, within the curved portion 241 which is closest to the bearing 20. In other words, the curved portion 241, and in particular its inner region, has a smaller stress concentration than in an elbow with a constant radius of curvature. Yet as mentioned above, it is the curved portion closest to the bearing which determines the dimensioning of the entire stabilizing bar. It is therefore possible to obtain either a stabilizing bar with better mechanical properties starting with an identical metallic billet, or a lighter stabilizing bar with identical mechanical properties. It is thus possible to obtain an improvement in mass relative to a stabilizing bar made of the same steel.

In certain variants, the curve has a radius of curvature which is a polynomial function f2 of the curvilinear abscissa s of said curve. In other words, the radius of curvature R of the curve is such that R=f2(s), where f2 is a polynomial function and s is the curvilinear abscissa of said curve. A polynomial function f2 of this type is, naturally, continuous, so that the radius of curvature R varies continually as discussed above.

Naturally, the polynomial function f2 has a degree at least equal to 1, so that the radius of curvature R is actually strictly decreasing between Rmax=f2 (s=0) and Rmin=f2 (s=smax) over the interval [0; smax] of the curvilinear abscissa s to be considered for the curve. In addition, the polynomial function f2 is naturally strictly positive, taking into account the fact that a radius of curvature is by definition strictly positive.

In addition, the curvilinear abscissa s of the curve is defined so that its zero is at the point of the curve which is closest to the bearing 20, i.e., in the example of FIG. 6, at the point of the curve which is in contact with the rectilinear portion 51. In addition, the curve is oriented in such a way that its curvilinear abscissa s increases when the curve is followed while moving away from the bearing 20. The direction of orientation DO of the curvilinear abscissa is shown in FIG. 6.

It is specified that the stabilizing bar 210 can be manufactured by bending, in a similar manner to the stabilizing bar 10. Finally, it is specified that the stabilizing bar 210 can comprise, between the central portion 11 and the attachment portion 12', at least one second curved portion similar to the second curved portion 41' described above in connection with the stabilizing bar 10.

Although the present disclosure has been described by referring to specific examples, modifications can be applied to these examples without departing from the general scope of the disclosure as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a product or to a device, and conversely, all the features described with reference to a product or to a device are transposable, alone or in combination, to a method.

The invention claimed is:

1. A stabilizing bar for a vehicle, comprising:

a central portion, which is elongate;

a first attachment portion configured to be attached to a first part of the vehicle secured to a first wheel of the vehicle; and a first bearing configured to be attached to a chassis of the vehicle, the stabilizing bar comprising, between the first bearing and one of the central portion and of the first attachment portion, a first rectilinear portion, a first curved portion, and a second rectilinear portion, the first curved portion extending between the first rectilinear portion and the second rectilinear portion and being curved along a first curve having a radius of curvature which is strictly increasing with increasing distance from the first bearing, so that the first curved portion has no region with a constant or decreasing radius of curvature from the first rectilinear portion until the second rectilinear portion.

2. The stabilizing bar according to claim 1, wherein the first curve has a radius of curvature which is a polynomial function of the curvilinear abscissa of the first curve.

3. The stabilizing bar according to claim 2, wherein the first curve has a radius of curvature which is an affine function of the curvilinear abscissa of the first curve.

4. The stabilizing bar according to claim 1, comprising a plurality of first curved portions between the central portion and the first attachment portion, and in which at least the first curved portion closest to the first bearing is curved along a first curve having a radius of curvature which is strictly increasing with increasing distance from the first bearing.

5. The stabilizing bar according to claim 4, wherein said first curved portion closest to the first bearing is located between the first bearing and the first attachment portion.

6. The stabilizing bar according to claim 1, also comprising:

a second attachment portion configured to be attached to a second part of the vehicle secured to a second wheel of the vehicle; and a second bearing configured to be attached to the chassis of the vehicle, the stabilizing bar comprising, between the central portion and the second attachment portion, a second curved portion, the second curved portion being curved along a second curve having a radius of curvature which is strictly increasing with increasing distance from the second bearing.

7. The stabilizing bar according to claim 6, comprising a plurality of second curved portions between the central portion and the second attachment portion, and wherein at least the second curved portion closest to the second bearing is curved along a second curve having a radius of curvature which is strictly increasing with increasing distance from the second bearing.

8. The stabilizing bar according to claim 7, wherein said second curved portion closest to the second bearing is located between the second bearing and the second attachment portion.

9. The stabilizing bar according to claim 6, wherein the first curve and the second curve are symmetrical.

10. The stabilizing bar according to claim 1, wherein the stabilizing bar has a hollow cross section.

11. The stabilizing bar according to claim 1, wherein the stabilizing bar is manufactured by bending of a metallic billet.

12. The stabilizing bar according to claim 11, wherein the metallic billet has a circular, elliptical, oval or ovoid cross section.

13. The stabilizing bar according to claim 11, wherein the metallic billet has a variable cross section along its length.

14. A stabilizing bar for a vehicle, comprising:

a central portion, which is elongate;

a first attachment portion configured to be attached to a first part of the vehicle secured to a first wheel of the vehicle; and a first bearing configured to be attached to a chassis of the vehicle, the stabilizing bar comprising, between the first bearing and one of the central portion and of the first attachment portion, a first rectilinear portion, a first curved portion, and a second rectilinear portion, the first curved portion extending between the first rectilinear portion and the second rectilinear portion and being curved along a first curve having a radius of curvature which is strictly decreasing with increasing distance from the first bearing, so that the first curved portion has no region with a constant or increasing radius of curvature from the first rectilinear portion until the second rectilinear portion.

15. The stabilizing bar according to claim 14, wherein the first curve has a radius of curvature which is a polynomial function of the curvilinear abscissa of said curve.

16. The stabilizing bar according to claim 15, wherein the first curve has a radius of curvature which is an affine function of the curvilinear abscissa of said curve.

17. The stabilizing bar according to claim 14, comprising a plurality of first curved portions between the central portion and the first attachment portion, and in which at least the first curved portion closest to the first bearing is curved along a first curve having a radius of curvature which is strictly decreasing with increasing distance from the first bearing.

18. The stabilizing bar according to claim 17, wherein said first curved portion closest to the first bearing is located between the first bearing and the first attachment portion.

19. The stabilizing bar according to claim 14, also comprising:

a second attachment portion configured to be attached to a second part of the vehicle secured to a second wheel of the vehicle; and a second bearing configured to be attached to the chassis of the vehicle, the stabilizing bar comprising, between the central portion and the second attachment portion, a second curved portion, the second curved portion being curved along a second curve having a radius of curvature which is strictly decreasing with increasing distance from the second bearing.

20. The stabilizing bar according to claim 19, comprising a plurality of second curved portions between the central portion and the second attachment portion, and wherein at least the second curved portion closest to the second bearing is curved along a second curve having a radius of curvature which is strictly decreasing with increasing distance from the second bearing.

21. The stabilizing bar according to claim 20, wherein said second curved portion closest to the second bearing is located between the second bearing and the second attachment portion.

22. The stabilizing bar according to claim 14, wherein the first curve and the second curve are symmetrical.

* * * * *